(12) United States Patent
Hou et al.

(10) Patent No.: US 11,328,732 B2
(45) Date of Patent: May 10, 2022

(54) GENERATING SUMMARY TEXT COMPOSITIONS

(71) Applicant: International Business Machines Corporation, Armonk, NY (US)

(72) Inventors: Yufang Hou, Dublin (IE); Beat Buesser, Dublin (IE); Bei Chen, Blanchardstown (IE); Akihiro Kishimoto, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/022,977

(22) Filed: Sep. 16, 2020

(65) Prior Publication Data
US 2022/0084524 A1 Mar. 17, 2022

(51) Int. Cl.
*G10L 15/26* (2006.01)
*G10L 15/08* (2006.01)
*G06F 16/34* (2019.01)
*G06F 17/00* (2019.01)

(52) U.S. Cl.
CPC ............. *G10L 15/26* (2013.01); *G10L 15/08* (2013.01); *G06F 16/345* (2019.01)

(58) Field of Classification Search
CPC ....... G10L 15/26; G10L 15/08; G06F 16/345; G06F 17/271; G06F 17/2785
See application file for complete search history.

(56) References Cited

U.S. PATENT DOCUMENTS 6,205,456 B1   3/2001   Nakao
7,386,453 B2   6/2008   Polanyi et al.
(Continued)

FOREIGN PATENT DOCUMENTS

CA   2496567 A1   3/2004
CN   101373486 B   6/2010
(Continued)

OTHER PUBLICATIONS

Yan et al., "Summarize What You Are Interested In: An Optimization Framework for Interactive Personalized Summarization", Proceedings of the 2011 Conference on Empirical Methods in Natural Language Processing, pp. 1342-1351, Jul. 27-31, 2011.
(Continued)

*Primary Examiner* — Quoc A Tran
(74) *Attorney, Agent, or Firm* — Stosch Sabo

(57) ABSTRACT

A method for generating a summary text composition can include obtaining historical reading data of a user. The method can include generating, based on the historical reading data, a reading proficiency level of the user. The method can include selecting, based on the reading proficiency level, a summarization model from a set of summarization models. The method can include obtaining a target composition. The target composition can be selected from the group consisting of a literary work, a video recording, and an audio recording. The method can include generating, by the summarization model, the summary text composition. The summary text composition can correspond to the target composition and have a first reading level classification that matches the reading proficiency level. The method can include transmitting the summary text composition to a computing device.

20 Claims, 6 Drawing Sheets

(56) References Cited

U.S. PATENT DOCUMENTS

| | | | |
|---|---|---|---|
| 8,888,493 B2 | 11/2014 | Sheehan et al. | |
| 9,507,778 B2 | 11/2016 | Jaffe et al. | |
| 10,134,297 B2 | 11/2018 | Beigman Klebanov et al. | |
| 10,424,217 B1 | 9/2019 | Sheehan | |
| 2002/0156632 A1* | 10/2002 | Haynes | G09B 7/04 704/270 |
| 2014/0099624 A1 | 4/2014 | Dohring et al. | |
| 2015/0050625 A1* | 2/2015 | Stein | G09B 5/02 434/169 |
| 2016/0098397 A1* | 4/2016 | Doherty | G06F 16/9535 707/769 |

FOREIGN PATENT DOCUMENTS

| | | |
|---|---|---|
| CN | 107506346 A | 12/2017 |
| WO | 2000029985 A8 | 5/2000 |

OTHER PUBLICATIONS

Hu et al., "ContextEnhanced Personalized Social Summarization", Proceedings of COLING 2012: Technical Papers, pp. 1223-1238, Dec. 2012.

Radev et al., "WebInEssence: A Personalized Web-Based Multi-Document Summarization and Recommendation System", Published 2008, 10 pages.

Unknown, "Grade Three Reading Proficiency Indicators", 2013, 14 pages.

Vaswani et al., "Attention Is All You Need", Dec. 6, 2017, 15 pages.

Li et al., "Multi-modal Summarization for Asynchronous Collection of Text, Image, Audio and Video", Proceedings of the 2017 Conference on Empirical Methods in Natural Language Processing, pp. 1092-1102, Sep. 7-11, 2017.

Zhu et al., "MSMO: Multimodal Summarization with Multimodal Output", Proceedings of the 2018 Conference on Empirical Methods in Natural Language Processing, pp. 4154-4164, Oct. 31-Nov. 4, 2018.

Haq et al., "Personalized Movie Summarization Using Deep CNN-Assisted Facial Expression Recognition" Research Article, vol. 2019, Article ID 3581419, 11 pages.

Unknown, "From Adaptive Hypermedia to the Adaptive Web", Mensch & Computer 2003, Abstract Only, 4 pages.

De Bra, P., "After Twenty-Five Years of User Modeling and Adaptation . . . What Makes us UMAP?", UMAP'17, Jul. 9-12, 2017, Abstract Only, 1 page.

Mell et al., "The NIST Definition of Cloud Computing", Recommendations of the National Institute of Standards and Technology, Sep. 2011, 7 pages.

* cited by examiner

GENERATING SUMMARY TEXT COMPOSITIONS

BACKGROUND

The present disclosure relates to automated text generation, and more specifically, to automated generation of summary text compositions.

Computer-implemented methods can be employed to summarize content of electronic literary documents. Such methods can be employed to facilitate document classification and searching.

SUMMARY

According to embodiments of the present disclosure, a method for generating a summary text composition can include obtaining historical reading data of a user. The method can include generating, based on the historical reading data, a reading proficiency level of the user. The method can include selecting, based on the reading proficiency level, a summarization model from a set of summarization models. The method can include obtaining a target composition. The target composition can be selected from the group consisting of a literary work, a video recording, and an audio recording. The method can include generating, by the summarization model, the summary text composition. The summary text composition can correspond to the target composition. The summary text composition can further have a first reading level classification that matches the reading proficiency level. The method can include transmitting the summary text composition to a computing device.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
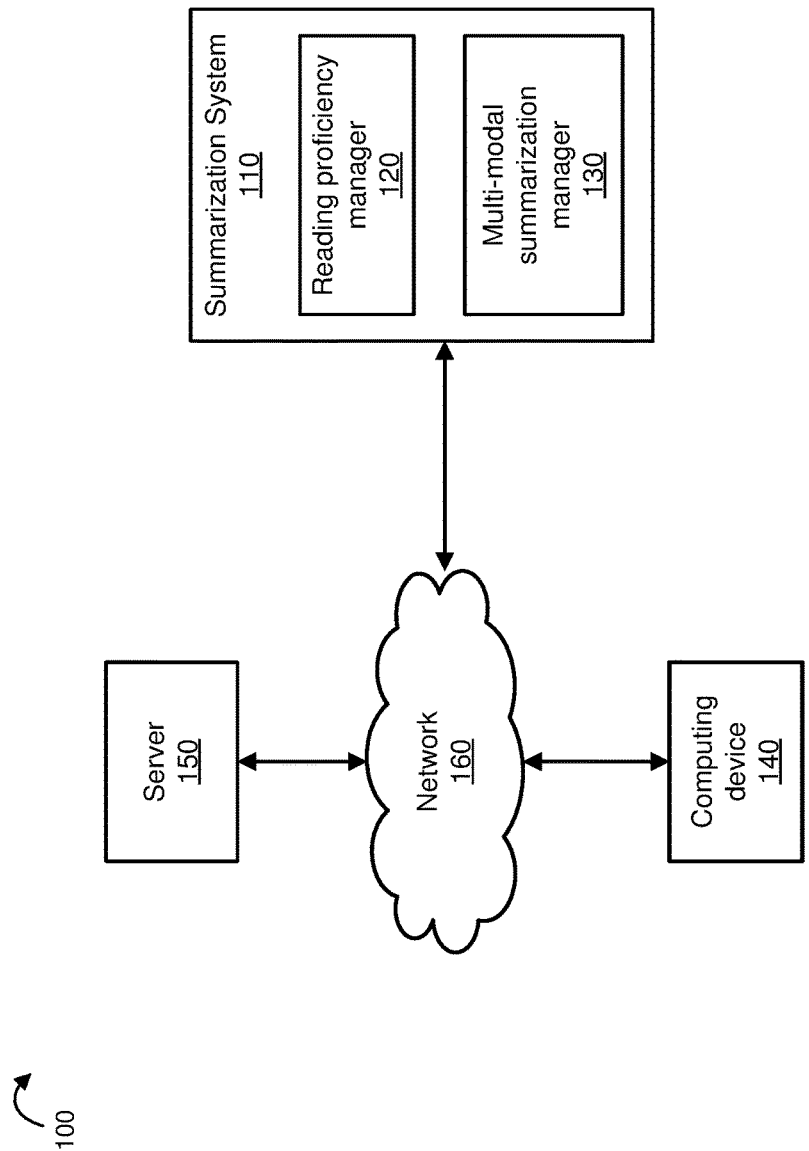
FIG. 1 depicts an example computing environment having a summarization system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated text generation; more particular aspects relate to automated generation of summary text compositions. While the present disclosure is not necessarily limited to such applications, various aspects of the disclosure may be appreciated through a discussion of various examples using this context.

Compositions, such as literary works, video recordings, and audio recordings can be produced for audiences having various levels of education, expertise, and/or reading proficiency. Accordingly, such compositions can include varying levels of the detail, complexity, and length. In some instances, a user may wish to acquire information from a composition that was produced for an audience having a level of education, expertise, and/or reading proficiency greater than that of the user. Additionally, in some instances, the user may have a limited time to acquire such information. In other instances, a user, such as an instructor, may understand the information presented in a composition, such as a literary work, but may need to explain the information to another, such as a student, within a brief appointment time.

To address these and other challenges, embodiments of the present disclosure include a summarization system. In some embodiments, the summarization system can generate a summary text composition that can summarize and/or paraphrase a literary work, video recording, or audio recording. Furthermore, the summary text composition can be tailored to a user's reading proficiency level. In some embodiments, the summarization system can determine the user's reading proficiency level based on historical reading data of the user. In some embodiments, the summarization system can generate a summary text composition that accounts for custom constraints of a user, such as a maximum number of words for the summary text composition. Thus, embodiments of the present disclosure can reform content of a literary work, video recording, or audio recording into a summary text composition that is customized for a user. Accordingly, embodiments of the present disclosure can facilitate a user's ability to efficiently construe compositions that were produced for an audience having a level of education, expertise, and/or reading proficiency that may be greater than that of the user.

Turning to the figures, FIG. 1 illustrates a computing environment 100 that includes one or more of each of a summarization system 110, computing device 140, server 150, and/or a network 160. In some embodiments, at least one summarization system 110, computing device 140, and/or server 150 can exchange data with at least one other through the at least one network 160. For example, in some embodiments, at least one summarization system 110 can exchange data with at least one server 150 through the at least one network 160. One or more of each of the summarization system 110, computing device 140, server 150, and/or network 160 can include a computer system, such as the computer system 401 discussed with respect to FIG. 4.

In some embodiments, the summarization system 110 can be included in software installed on a computer system of at least one of the computing device 140 and/or server 150. In an example, in some embodiments, the summarization system 110 can be included as a plug-in software component of software installed on the computing device 140. The summarization system 110 can include program instructions implemented by a processor, such as a processor of the computing device 140, to perform one or more operations discussed with respect to FIGS. 2 and 3.

In some embodiments, the summarization system 110 can include one or more modules, such as a reading proficiency manager 120 and/or a multi-modal summarization manager 130. In some embodiments, the reading proficiency manager 120 and the multi-modal summarization manager 130 can be integrated into a single module. In some embodiments, the reading proficiency manager 120 can be configured to determine a reading proficiency level of a user. In some embodiments, the multi-modal summarization manager 130 can be configured to generate a summary text composition. For example, the reading proficiency manager 120 and/or multi-modal summarization manager 130 can include program instructions implemented by a processor, such as a processor of the computing device 140, to perform one or more operations discussed with respect to FIGS. 2 and 3. Particularly, in some embodiments, the reading proficiency manager 120 can include program instructions to perform operations 305 and 310, FIG. 3. In some embodiments, the multi-modal summarization manager 130 can include program instructions to perform operations 315-345, FIG. 3. An embodiment of the summarization system 110 is discussed with respect to FIG. 2, below (i.e., summarization system 225, FIG. 2).

In some embodiments, the at least one computing device 140 can include a device such as a notebook computer, tablet, mobile phone, and/or desktop computer. Thus, the computing device 140 can include user-interface components (not shown), such as a screen, touchscreen, microphone, and/or keyboard. Such user-interface components can allow a user to view a summary text composition generated by the summarization system 110 and input feedback and/or custom constraints to be transmitted to the summarization system 110. In some embodiments, the computing device 140 can store data such as historical reading data, custom constraints, training datasets, machine learning models, and/or one or more target compositions to be summarized by the summarization system 110.

In some embodiments, the at least one server 150 can include a web server configured to store and transmit data such as historical reading data, one or more target compositions, training datasets, machine learning models, and/or custom constraints (discussed in further detail, below). In some embodiments, the at least one network 160 can be a wide area network (WAN), a local area network (LAN), the internet, or an intranet. In some embodiments, the network 160 can be identical or substantially similar to the cloud computing environment 50, discussed with respect to FIG. 5.

Figure 2:
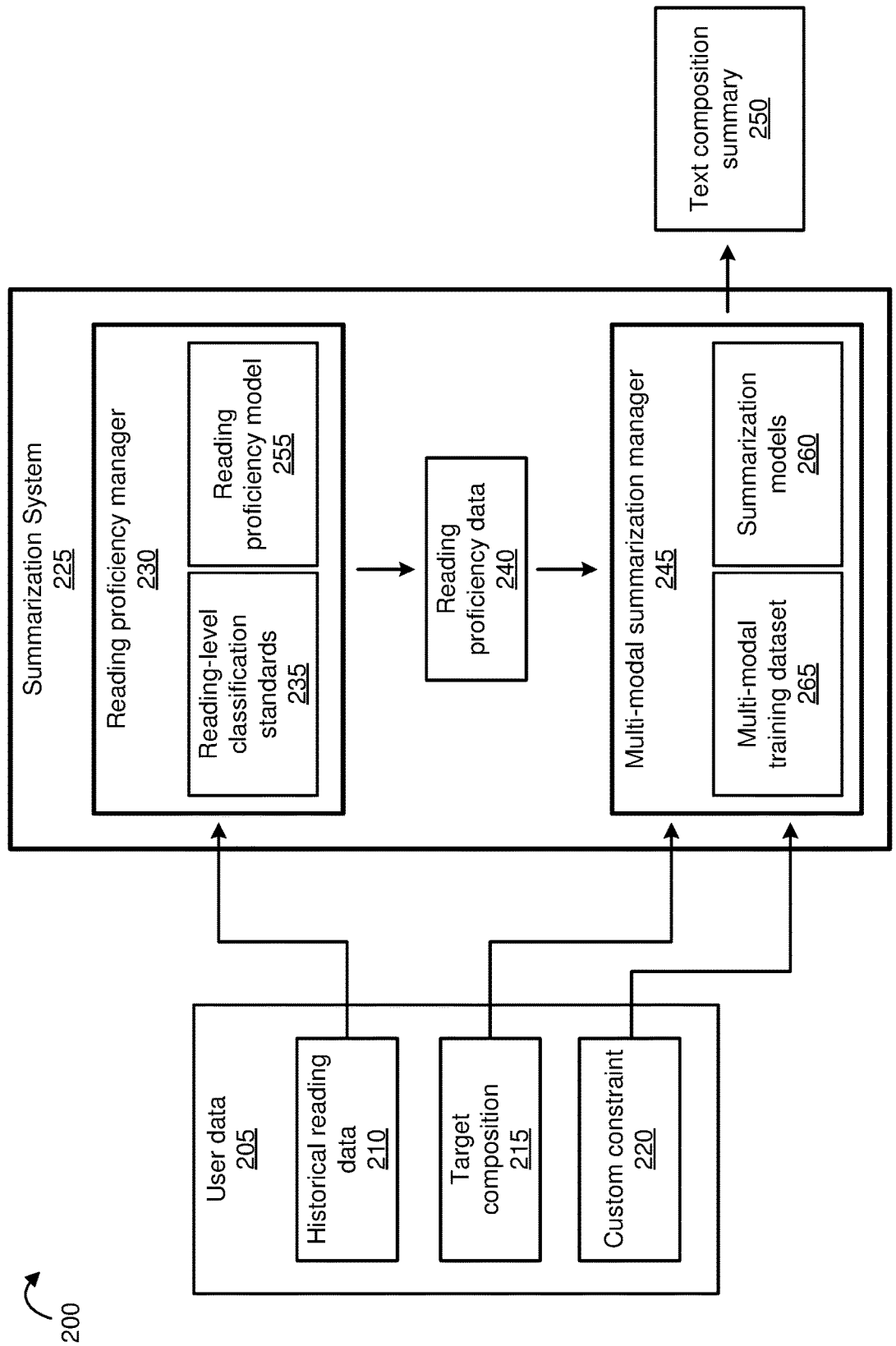
FIG. 2 depicts an example system block diagram of a summarization system, in accordance with embodiments of the present disclosure.

FIG. 2 illustrates an example system block diagram 200 of a summarization system 225, in accordance with embodiments of the present disclosure. In some embodiments, the summarization system 225 can be identical or substantially similar to the summarization system 110, discussed with respect to FIG. 1.

Referring back to FIG. 2, the summarization system 225 can obtain user data 205 from a source such as a computing device (e.g., computing device 140, FIG. 1) and/or a server (e.g., server 150, FIG. 1) and generate a text composition summary 250 based, at least in part, on the user data 205. In some embodiments, the user data 205 can include historical reading data 210, a target composition 215, and at least one custom constraint 220.

In some embodiments, historical reading data 210 can include information regarding literary works that have been acquired and/or read by a user. For example, in some embodiments, historical reading data 210 can include one or more electronic documents containing literary works (e.g., books, articles, research papers, and the like) that the user has read. In some embodiments, historical reading data 210 can include a history of literary works acquired and/or purchased by a user. For example, such a history can include a list of books the user has borrowed from a library and/or a list of books the user has purchased from one or more websites. In some embodiments, historical reading data 210 can include information regarding a user's reading characteristics. For example, historical reading data 210 can include an average reading speed of a user (e.g., an average number of words read per minute). In some embodiments, the reading proficiency manager 230 of the summarization system 225 can obtain the historical reading data 210 from a source such as a computing device and/or a server.

In some embodiments, the target composition 215 can include information to be summarized in a text composition summary 250. For example, in some embodiments, the target composition 215 can be an electronic file containing a literary work, video recording, or audio recording. Thus, in some embodiments, the target composition 215 can include an electronic document containing text, a digital video file, or a digital audio recording. In some embodiments, the target composition 215 can include a transcript of a video recording or audio recording. In some embodiments, the multi-modal summarization manager 245 of the summarization system 225 can obtain the target composition 215 from a source such as a computing device and/or a server.

In some embodiments, the at least one custom constraint 220 can include predetermined criteria for the text composition summary 250 to be generated by the summarization system 225. For example, in some embodiments, the at least one custom constraint 220 can include a threshold word count not to be exceeded in the text composition summary 250. For example, the at least one custom constraint 220 can include a word limit of 500 words. In this example, the summarization system 225 can obtain the word limit and generate a summary text composition that does not exceed 500 words. In some embodiments, the at least one custom constraint 220 can include an approximate reading time. For example, in some embodiments, the at least one custom constraint 220 can include an approximate 30-minute reading time for a user. In this example, the summarization system 225 can obtain the reading time and generate a summary text composition having a number of words that the summarization system 225 predicts the user can read within approximately 30 minutes. In this example, such a prediction can be based, at least in part, on historical reading data 210 (e.g., an average reading speed of a user). In some embodiments, the at least one custom constraint can be predetermined by an entity such as a user and input into a computing device (e.g. computing device 140, FIG. 1). In some embodiments, the multi modal summarization manager 245 of the summarization system 225 can obtain the at least one custom constraint 220 from a source such as a computing device and/or a server.

In some embodiments, the reading proficiency manager 230 can be identical or substantially similar to the reading proficiency manager 120 discussed with respect to FIG. 1. In some embodiments, the reading proficiency manager 230 can be configured to predict a reading proficiency level of a user. In some embodiments, the reading proficiency manager 230 can generate such a prediction by employing a reading proficiency model 255 and/or a set of reading-level classification standards 235.

The set of reading-level classification standards 235 can include characteristics that can be associated with a literary work to determine a level of complexity of the literary work. In some embodiments, the summarization system 225 can obtain the set of reading-level classification standards 235 from a computing device or a server, such as a web server for a third-party website. In some embodiments, the reading proficiency manager 230 can predict a reading proficiency level of a user based, at least in part, on a comparison of one or more literary works included in the user's historical reading data 210 to the set of reading-level classification standards 235.

For example, in some embodiments, the set of reading-level classification standards 235 can include a table, such as TABLE 1 below.

TABLE 1

| Characteristics | Reading level classification | |
| --- | --- | --- |
| | 1 | 2 |
| Average sentence length (number of words) | x1 | y1 |
| Vocabulary terms from List A | x2 | y2 |
| Vocabulary terms from List B | x3 | y3 |
| Simple sentences | x4 | y4 |
| Compound sentences | x5 | y5 |
| Complex sentences | x6 | y6 |
| Complex-compound sentences | x7 | y7 |

TABLE 1 includes an example set of characteristics and corresponding values under two reading level classifications. In some embodiments, such values can be threshold ranges associated with a reading level 1 classification and a reading level 2 classification of a literature composition. A literature composition can refer to a literary work, such as a book or article, or a transcript, such as a transcript of a video recording or audio recording. In this example, the reading level 2 classification can represent a higher level of complexity than the reading level 1 classification.

In TABLE 1, the variables x1-x7 represent numerical values associated with the reading level 1 classification, and the variables y1-y7 represent numerical values associated with the reading level 2 classification. For example, in some embodiments, x1 can represent the range 5 to 10, and y1 can represent the range 11 to 18. Thus, in this example, a reading level 1 classification can be associated with a literary work having an average sentence length of 5 to 10 words. Further in this example, a reading level 2 classification can be associated with a literary work having an average sentence length of 11 to 18 words. Similarly, x2 and y2 can represent numerical ranges of vocabulary terms from List A. In this example, List A can include vocabulary terms typically encountered in high school curriculums; List B can include vocabulary terms typically encountered in university curriculums. Thus, the reading level 1 classification can be associated with a higher number of vocabulary terms from List A than from List B. Additionally in this example, the reading level 2 classification can be associated with a higher number of vocabulary terms from list B than from list A.

A reading level classification can indicate a level of complexity associated with a literature composition (e.g., a literary work or a transcript). Characteristics such as vocabulary and grammatical structure of a literature composition can indicate its level of complexity, and hence, its reading level classification.

For example, in some instances, a first literary work, such as a children's storybook, can include only simple sentences (i.e., sentences having one independent clause and no dependent clauses). Furthermore, each of the sentences can have five or fewer words. Based, at least in part, on these characteristics, the first literary work can have a lowest level of complexity. Accordingly, the first literary work can have a lowest reading level classification (e.g., a reading level 1 classification on a scale of 1 to 10). Continuing with this example, a second literary work, such as a legal treatise, can include a plurality of sentence types, ranging from simple sentences to complex-compound sentences (e.g., sentences having multiple independent clauses and at least one dependent clause). Additionally, a majority of the sentences of the second literary work can have 15 or more words. Based, at least in part, on these characteristics, the second literary work can have a highest level of complexity, and thus, a highest reading level classification (e.g., a reading level 10 classification on a scale of 1 to 10). Although this example presents only two reading level classifications, embodiments of the present disclosure can include a plurality of reading level classifications, such as 10 reading level classifications ranging from 1 to 10, in order of increasing complexity.

A reading proficiency level can refer to a user's proficiency in comprehending a literature composition (e.g., a literary work or a transcript) having a corresponding reading level classification. For example, in some embodiments, a user having a level-1 reading proficiency can refer to the user being proficient in comprehending an article having a reading level 1 classification. In another example, a user having a level-5 reading proficiency can refer to the user being proficient in comprehending a transcript having a reading level 5 classification. Accordingly, in some embodiments, the reading proficiency manager 230 can predict a user's reading proficiency level based, at least in part, on reading level classifications of one or more literary works included in the user's historical reading data 210.

For example, in some embodiments, the reading proficiency manager 230 can compare a set of literary works included in the user's historical reading data 210 to the set of reading-level classification standards 235. Based on the comparison, the reading proficiency manager can determine that the set of literary works has an average reading level 6 classification. Accordingly, in this example, the reading proficiency manager 230 can predict that the user has a matching/corresponding reading proficiency level (i.e., a level-6 reading proficiency).

In some embodiments, the reading proficiency manager 230 can include a reading proficiency model 255. In some embodiments, the reading proficiency model 255 can be a machine-learning model configured to predict a reading proficiency level of a user, based at least in part on the historical reading data 210. In some embodiments, the reading proficiency model 255 can predict a reading level classification for a literature composition obtained by the reading proficiency manager 230. The reading proficiency model 255 can be generated by training a machine-learning algorithm with data, such as a plurality of literature compositions, questionnaire responses, and/or reading-level classification standards (e.g., reading-level classification standards 235). Such training can include performing supervised, unsupervised, or semi-supervised training with such data. Additionally, such training can allow the reading proficiency model 255 to predict a reading proficiency level of a user with improved accuracy. In some embodiments, the reading proficiency manager 230 can employ natural language processing technology to identify characteristics of a literature composition and/or to predict a reading proficiency level of a user.

In some embodiments, the reading proficiency manager 230 can transmit reading proficiency data 240 to the multi-modal summarization manager 245. In some embodiments, the reading proficiency data 240 can include a reading proficiency level of a user and/or an average reading speed of the user.

The multi-modal summarization manager 245 can be configured to generate a text composition summary 250. A text composition summary 250 can refer to a natural-language writing (e.g., a composition of words forming sentences that have grammatical structure) generated by the summarization system 225. The text composition summary 250 can include a summarization of one or more concepts and/or a paraphrasing of one or more sentences included in the target composition 215. Accordingly, the text composition summary 250 can correspond to the target composition 215. Furthermore, the text composition summary 250 can have a level of complexity, and therefore a reading level classification, that is different (e.g., lower) than that of a target composition 215. Thus, the text composition summary 250 can convey meanings and/or concepts presented in the target composition 215, but exhibit characteristics (e.g. vocabulary and/or grammatical structure) that are different from those of a target composition 215. In some embodiments, the text composition summary 250 can be included in an electronic document, such as a text file, generated by the multi-modal summarization manager 245.

The generation of the text composition summary 250 can be based, at least in part, on a target composition 215 and reading proficiency data 240. In some embodiments, the generation of the text composition summary 250 can further be based, at least in part, on at least one custom constraint 220. For example, in some embodiments, the multi-modal summarization manager 245 can obtain a target composition 215 in the form of a 500-word research paper. The research paper can be deemed by a user to have a high level of complexity (e.g., a reading level 10 classification). In this example, the multi-modal summarization manager 245 can further obtain a custom constraint 220 in the form of a 100-word limit. Continuing with this example, the multi-modal summarization manager 245 can further obtain reading proficiency data 240 that includes the user's predicted level-6 reading proficiency. In this example, the multi-modal summarization manager 245 can be configured to generate, from the obtained information, a text composition summary 250. The text composition summary 250 can have a level of complexity that matches the reading proficiency level of the user (e.g., the text composition summary can have a reading level 6 classification). Additionally, in this example, the text composition summary 250 can include a maximum of 100 words.

In some embodiments, the multi-modal summarization manager 245 can obtain a target composition 215 in the form of a video recording or audio recording (e.g., a digital video or audio file). In these embodiments, the multimodal summarization manager 245 can be configured to employ audio analysis and/or natural language processing technology to generate a transcript of the video recording or audio recording. Such a transcript can be a writing, such as an electronic text document, that includes the words uttered in the video recording or audio recording. Thus, in these embodiments, the multi-modal summarization manager 245 can generate a text composition summary 250 based, at least in part, on the transcript of the video recording or audio recording. Thus, embodiments of the present disclosure can provide versatile functionality, as embodiments of the present disclosure can generate customized text composition summaries that can be based on various modes of input compositions (e.g., literary works, video recordings, and/or audio recordings).

In some embodiments, the multi-modal summarization manager 245 can include a set of summarization models 260 and a multi-modal training dataset 265. The set of summarization models 260 can include one or more machine-learning models, each configured to generate a text composition summary 250. In some embodiments, the set of summarization models 260 can be trained to employ deep learning and natural language processing technology to generate text composition summaries 250. For example, in some embodiments, such training can allow the set of summarization models 260 to analyze the text of a target composition 215, interpret concepts and/or meanings presented therein, and generate sentences that can convey those concepts and/or meanings with vocabulary and/or grammatical structure different from that of the target composition 215. For example, in some embodiments, the set of summarization models 260 can include one or more algorithms configured to extract and coherently connect a set of keywords and/or key phrases from a target composition 215. In some embodiments, the set of summarization models 260 can employ abstraction-based summarization to iteratively shorten and paraphrase a target composition 215 until a final text composition summary 250 is generated.

In some embodiments, training can allow the set of summarization models 260 to generate a text composition summary 250 that corresponds to a target composition 215 and that can also account for at least one custom constraint 220 (e.g., the 100-word limit described in the example above) and reading proficiency data 240 (e.g., the user's predicted level-6 reading proficiency described in the example above). In these embodiments, the training can allow the set of summarization models 260 to select words and generate sentences that can convey concepts and/or meanings presented in the target composition 215 in a manner that is more concise than that of the target composition 215.

In an example application of abstraction-based summarization to satisfy a word-limit custom constraint, a summarization model of the set of summarization models 260 can generate a first text composition summary. Afterward, the summarization model can perform a word count of the first text composition summary and compare the word count to the word-limit custom constraint. Continuing with this example, if the summarization model determines that the word count is greater than (i.e., exceeds) the word-limit custom constraint, then the summarization model can generate a second text composition summary. In some embodiments, the second text composition summary can be based on the first text composition summary (e.g., the summarization model can treat the first text composition summary as a target composition). Continuing with this example, the summarization model can perform a comparison between a word count of the second text composition summary and the word-limit custom constraint to determine if the word count exceeds the word-limit custom constraint. In this example, the summarization model can continue generating text composition summaries and comparing their respective word counts to the word-limit custom constraint until the summarization model generates a $n^{th}$ text composition summary having a word count that is less than or equal to the word-limit custom constraint. The $n^{th}$ text composition summary can be transmitted to a computing device (e.g., a user's computer) for review by a user.

In some embodiments, the set of summarization models 260 can include one or more summarization models, each of which can be trained to generate a text composition summary 250 having a predetermined reading level classification. For example, in some embodiments, the set of summarization models 260 can include three summarization models. The first summarization model can be trained to generate a text composition summary having a reading level 1 classification; the second summarization model can be trained to generate a text composition summary having a reading level 2 classification; and the third summarization model can be trained to generate a text composition having a reading level 3 classification. Accordingly, each summarization model of the set of summarization models 260 can be configured to generate a natural-language writing having characteristics (e.g. vocabulary and/or grammatical structure) that correspond to a specific reading level classification. In some embodiments, the characteristics can correspond with standards, such as reading-level classification standards 235.

In some embodiments, the multi-modal summarization manager 245 can select a summarization model of the set of summarization models 260 based on an obtained reading proficiency level of a user. For example, in some embodiments, the multi-modal summarization manager 245 can obtain reading proficiency data 240 that includes a level-2 reading proficiency of a user. In this example, the set of summarization models 260 can include the three summarization models described above. Accordingly, based on the level-2 reading proficiency of the user, the multi-modal summarization manager 245 can select the matching summarization model (i.e., the second summarization model). Such selection can allow the multi-modal summarization manager to generate a text composition summary having a reading level 2 classification; thus, the text composition summary can be tailored to the level-2 reading proficiency of the user.

In some embodiments, the multi-modal summarization manager 245 can include a multi-modal training dataset 265. The multi-modal training dataset 265 can include a multitude of literary works, video recordings, and/or audio recordings for training one or more machine-learning algorithms to generate each summarization model of the set of summarization models 260. In some embodiments, the summarization system 225 can perform such training. In some embodiments, the training can include a summarization model employing an encoder to encode text, video, and/or audio data from the literary works, video recordings, and/or audio recordings. In these embodiments, the summarization model can employ a decoder to generate a corresponding text composition summary. In some embodiments, the encoder can further encode reading proficiency data 240 and the at least one custom constraint 220. In these embodiments, the decoder can generate a corresponding text composition summary 250 that satisfies the at least one custom constraint and has a reading level classification that matches a user's reading proficiency. In some embodiments, to improve accuracy and reduce training time, the summarization manager 245 can rely on self-attention, rather than sequence-aligned recurrent neural networks or convolution, to perform encoding and decoding. In some embodiments, the training can include performing supervised, unsupervised, or semi-supervised training using the multi-modal training dataset 265. In some embodiments, the summarization system 225 can obtain the multi-modal training dataset 265 from a computing device or a server, such as a third-party web server.

According to embodiments for the present disclosure, machine-learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3:
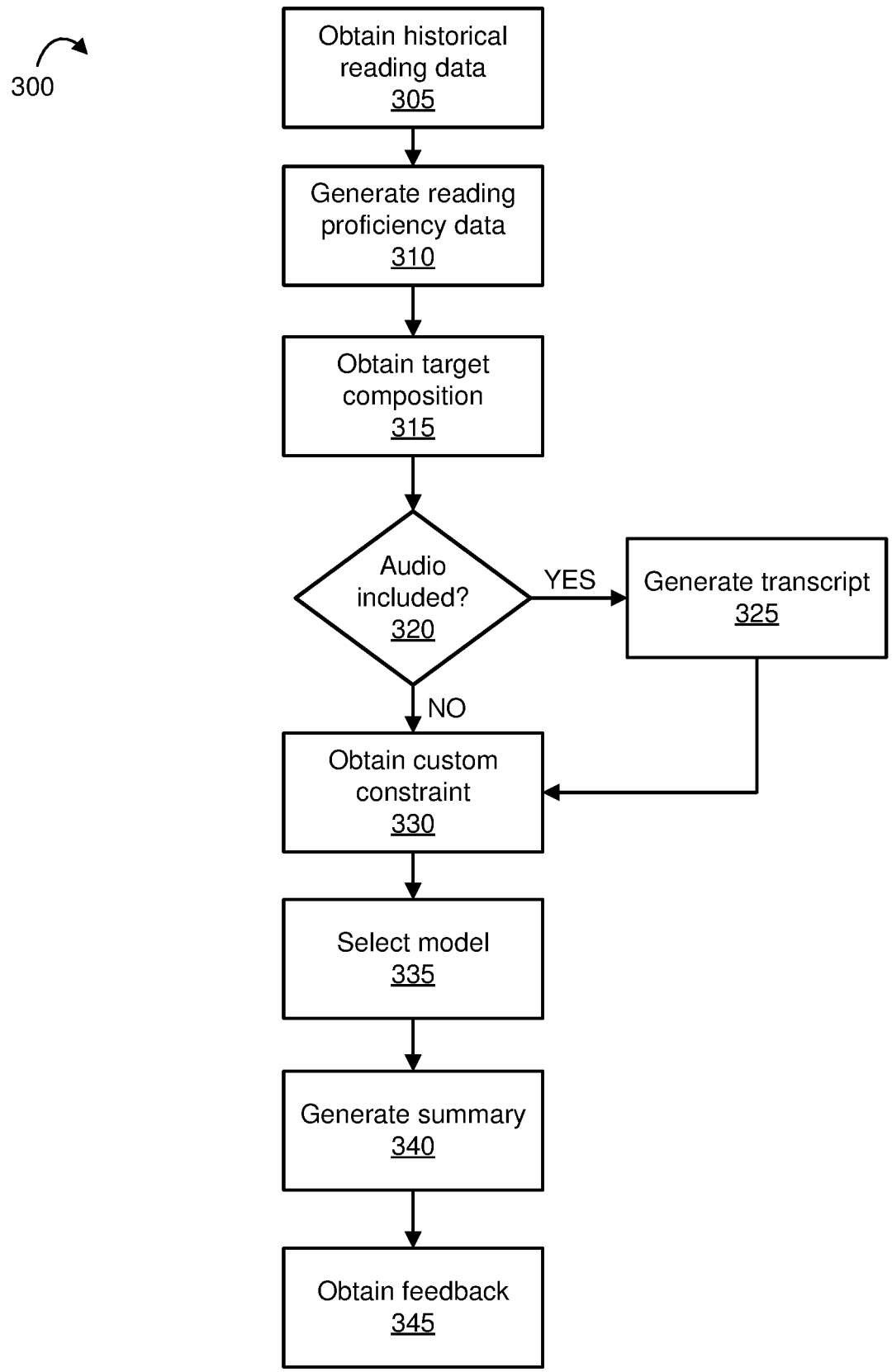
FIG. 3 depicts a flowchart of an example method for generating a summary text composition, in accordance with embodiments of the present disclosure.

FIG. 3 illustrates a flowchart of an example method 300 for generating a summary text composition, in accordance with embodiments of the present disclosure. Method 300 can be performed by a summarization system, such as summarization system 110, FIG. 1 and/or summarization system 225, FIG. 2.

In operation 305, the summarization system can obtain historical reading data (e.g., historical reading data 210, FIG. 2). In some embodiments, the summarization system can obtain historical reading data through a questionnaire presented to a user. For example, in some embodiments, the summarization system can include a graphical user interface on a computing device (e.g. computing device 140, FIG. 1). The graphical user interface can present questions to a user regarding the user's reading history (e.g., literature the user has read and/or acquired) and/or characteristics (e.g., the user's average reading speed). In some embodiments, the graphical user interface can present questions to evaluate the user's reading proficiency (e.g., questions to evaluate a user's comprehension of sample literature passages). In these embodiments, the user can input questionnaire responses through the graphical user interface. In some embodiments, the summarization system can obtain historical reading data from a user-created profile, such as a stored data profile of the summarization system and/or a stored data profile of a third-party entity (e.g., a company website from which the user has purchased books).

In operation 310, the summarization system can generate reading proficiency data, such as a reading proficiency level of a user and/or an average reading speed of the user. Operation 310 can include the summarization system performing at least one of: analyzing a user's responses to a questionnaire, analyzing historical reading data, comparing historical reading data to reading-level classification standards, and/or employing a reading proficiency model to predict a user's reading proficiency level.

In operation 315, the summarization system can obtain a target composition (e.g., an electronic file containing a literary work, video recording, or audio recording). The target composition can include information to be summarized in a summary text composition. In some embodiments, the target composition can have a first reading level classification, and the summarization system can generate a summary text composition having a second reading level classification that is different than the first reading level classification.

In operation 320, the summarization system can determine whether the target composition obtained in operation 315 includes audio data. For example, in some embodiments, the summarization system can determine that the target composition includes audio data when the target composition is an electronic/digital video file or an electronic/digital audio file. If the summarization system determines that the target composition includes audio data, then the summarization system can proceed to operation 325. Otherwise, if the summarization system determines that the target composition does not include audio data, then the summarization system can proceed to operation 330.

In operation 325, the summarization system can generate a transcript of the target composition obtained in operation 315. The transcript can be a writing, such as an electronic text document, that includes the words of the audio data (i.e., the words uttered in a video recording or audio recording).

In operation 330, the summarization system can obtain at least one custom constraint, such as a maximum word count for a text composition summary to be generated by the summarization system.

In operation 335, the summarization system can select a summarization model based on reading proficiency data generated in operation 310. For example, in some embodiments, operation 310 can include the summarization system predicting that a user has a level-5 reading proficiency. In this example, the summarization system can select a summarization model trained to generate a text composition summary having a reading level 5 classification. In this way, the summarization system can generate a text composition summary that is tailored to the user's reading proficiency level.

In operation 340, the summarization system can generate, using the summarization model selected in operation 335, a text composition summary. In some embodiments, the text composition summary can be a writing that summarizes one or more concepts and/or paraphrases one or more sentences included in the target composition obtained in operation 315. Thus, the text composition summary can correspond to the target composition. Furthermore, the text composition summary generated in operation 340 can have a reading level classification that matches a reading proficiency level of a user. As discussed above, in some embodiments, operation 340 can include the summarization system generating a text composition summary that accounts for at least one custom constraint obtained in operation 330. In some embodiments, operation 340 can include the summarization system transmitting/initiating a transfer of the text composition summary to a computing device (e.g., a user's computer) for review by a user.

In some embodiments, operation 340 can include the summarization system generating an adjusted text composition summary. In these embodiments, the summarization system can monitor a rate at which the user reads a text composition summary. For example, in some embodiments, the summarization system can monitor, through a computing device (e.g., a user's mobile phone), a rate at which a user orally reads a text composition summary. Based on the rate, the summarization system can estimate whether the user can complete the oral reading of the text composition summary within a predetermined time, such as within a custom constraint (e.g., an approximate reading time). If the summarization system estimates that the rate at which the user orally reads is not sufficient to allow the user to complete the reading within the predetermined time, the summarization system can generate an adjusted text composition summary. The adjusted text composition summary can be a text composition summary that corresponds to the unread portion of the text composition summary being read by the user. For example, in some embodiments, the summarization system can treat the unread portion as a target composition, such that it can be further summarized and/or paraphrased by a summarization model. In this way, the summarization system can dynamically generate a text composition summary that can allow a user to satisfy a custom constraint.

In some embodiments, in operation 345, the summarization system can obtain feedback from a user. For example, in some embodiments, operation 345 can include a user indicating to the summarization system whether the text composition summary generated in operation 340 is consistent with the user's reading proficiency level and/or whether portions of the text composition summary effectively convey concepts and/or meanings included in the target composition. In some embodiments, the summarization system can retrain one or more models based on such feedback. Thus, operation 345 can allow embodiments of the present disclosure to improve the accuracy and/or effectiveness of subsequent text composition summaries generated by the summarization system.

Figure 4:
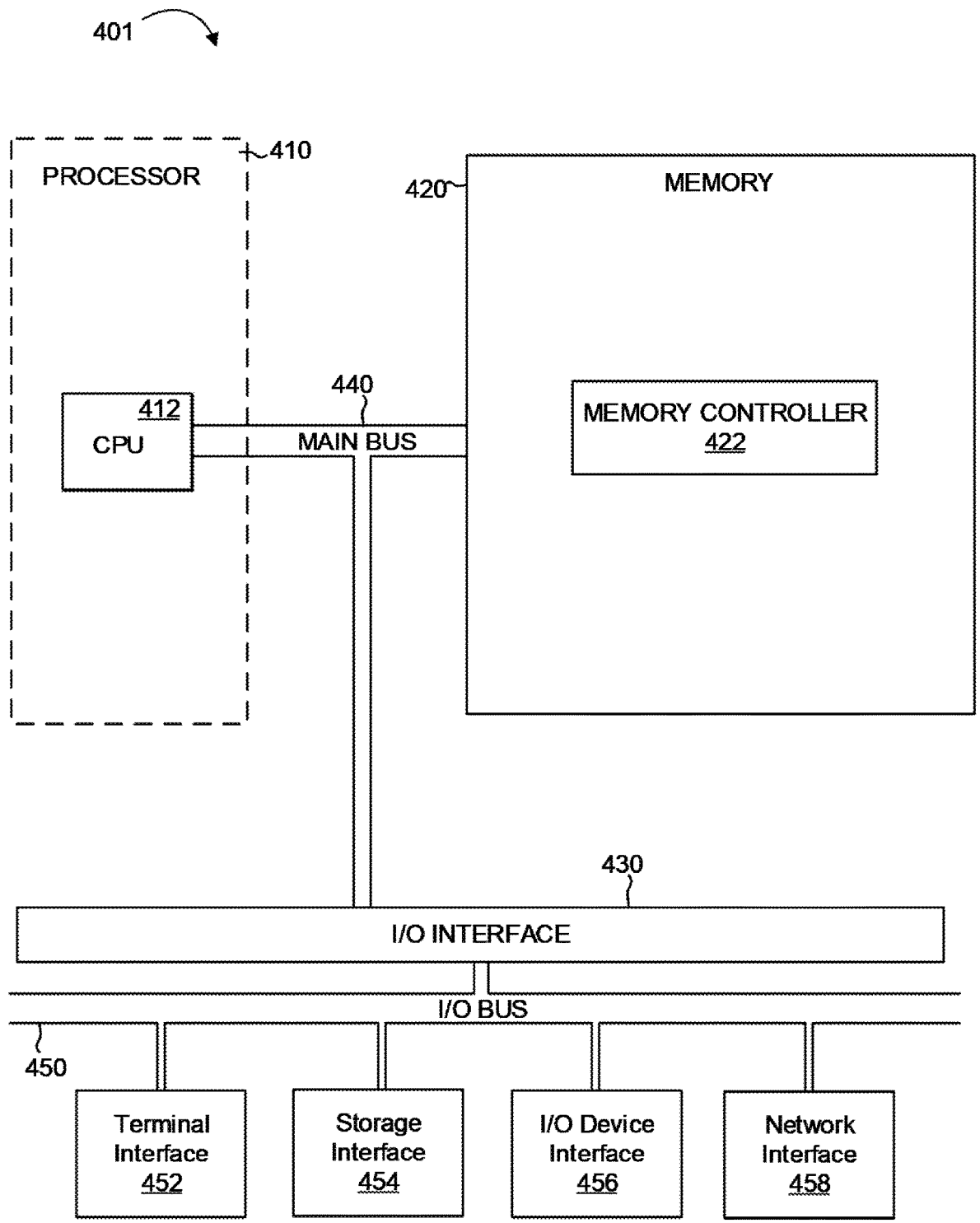
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
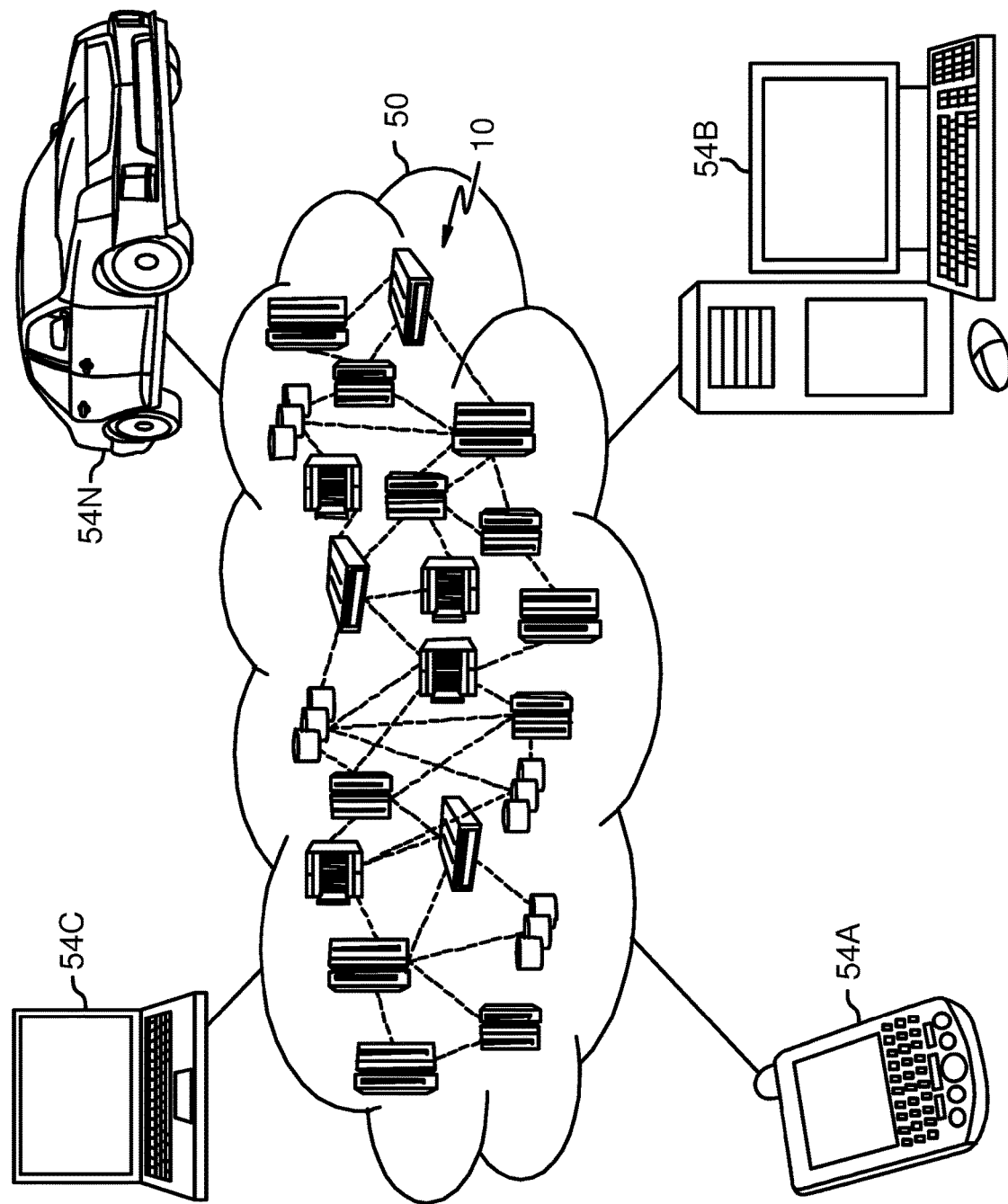
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
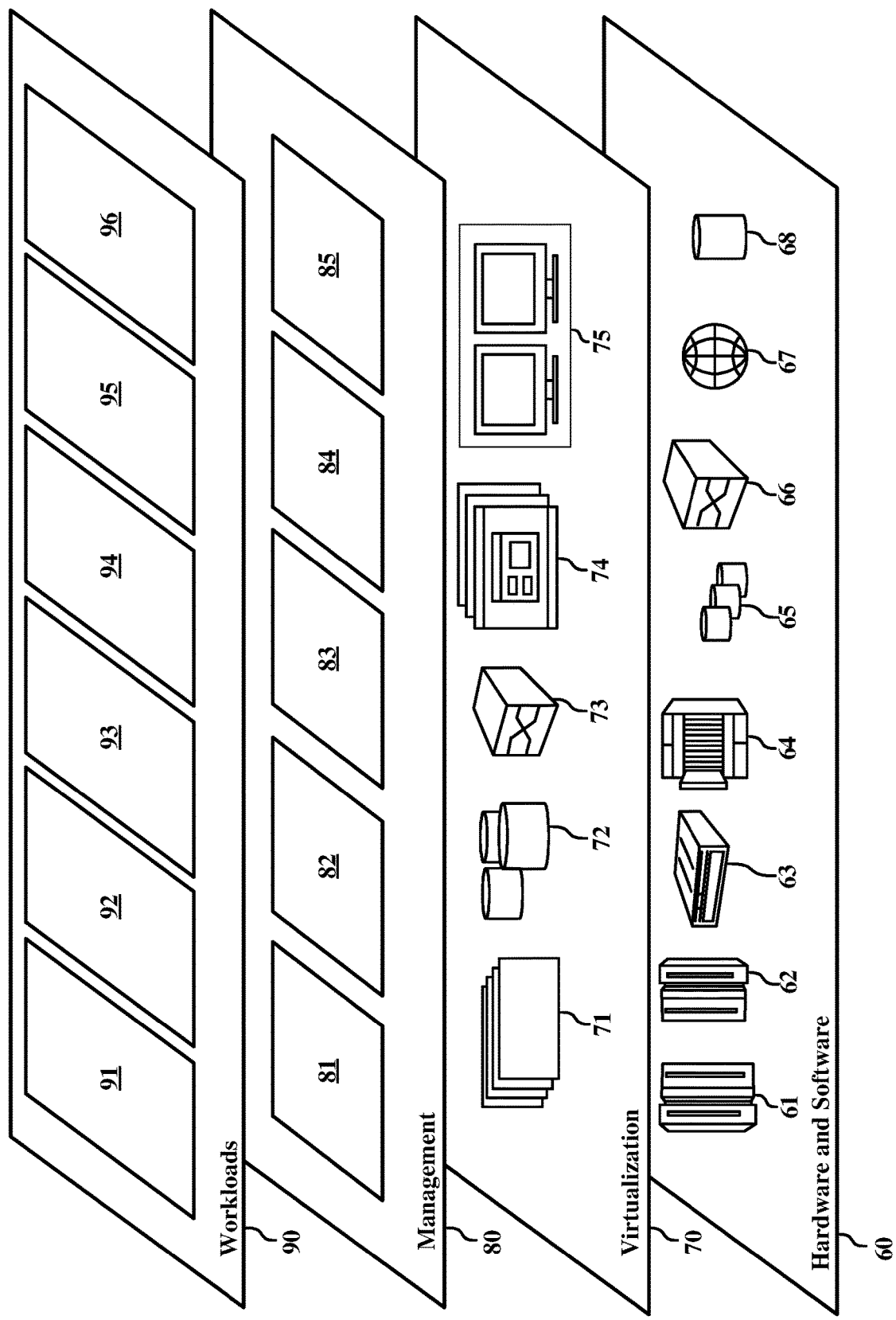
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and summarization logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for generating a summary text composition comprising:
    obtaining historical reading data of a user;
    generating, based on the historical reading data, a reading proficiency level of the user;
    selecting, based on the reading proficiency level, a summarization model from a set of summarization models, the summarization model comprising a trained machine-learning model;
    obtaining a target composition, the target composition selected from the group consisting of a literary work, a video recording, and an audio recording;
    obtaining a custom constraint comprising a predetermined specification for the summary text composition;
    generating, by the summarization model and based at least in part on the custom constraint, the summary text composition, the summary text composition corresponding to the target composition and having a first reading level classification that matches the reading proficiency level; and
    transmitting the summary text composition to a computing device.

2. The computer-implemented method of claim 1, wherein the target composition has a second reading level classification, the second reading level classification being higher than the first reading level classification.

3. The computer-implemented method of claim 1, wherein the target composition includes audio data; the method further comprising:
    generating a transcript of the audio data; and
    wherein the generating the summary text composition is based at least in part on the transcript of the audio data.

4. The computer-implemented method of claim 1, further comprising obtaining feedback from the user regarding the summary text composition.

5. The computer-implemented method of claim 1, wherein the historical reading data includes a literary-work purchase history of the user.

6. The computer-implemented method of claim 1, wherein the historical reading data includes the literary work; and
the determining the reading proficiency level comprises comparing the literary work to a set of reading-level classification standards.

7. The computer-implemented method of claim 1, wherein the custom constraint is selected from the group consisting of a word limit and a reading time.

8. A system comprising:
a processor; and
a memory in communication with the processor, the memory containing program instructions that, when executed by the processor, are configured to cause the processor to perform a method for generating a summary text composition, the method comprising:
obtaining historical reading data of a user;
generating, based on the historical reading data, a reading proficiency level of the user;
selecting, based on the reading proficiency level, a summarization model from a set of summarization models, the summarization model comprising a trained machine-learning model;
obtaining a target composition, the target composition selected from the group consisting of a literary work, a video recording, and an audio recording;
obtaining a custom constraint comprising a predetermined specification for the summary text composition;
generating, by the summarization model and based at least in part on the custom constraint, the summary text composition, the summary text composition corresponding to the target composition and having a first reading level classification that matches the reading proficiency level; and
transmitting the summary text composition to a computing device.

9. The system of claim 8, wherein the target composition has a second reading level classification, the second reading level classification being higher than the first reading level classification.

10. The system of claim 8, wherein the target composition includes audio data; the method further comprising:
generating a transcript of the audio data; and
wherein the generating the summary text composition is based at least in part on the transcript of the audio data.

11. The system of claim 8, further comprising obtaining feedback from the user regarding the summary text composition.

12. The system of claim 8, wherein the historical reading data includes a literary-work purchase history of the user.

13. The system of claim 8, wherein the historical reading data includes the literary work; and
the determining the reading proficiency level comprises comparing the literary work to a set of reading-level classification standards.

14. The system of claim 8, wherein the custom constraint is selected from the group consisting of a word limit and a reading time.

15. A computer program product comprising a computer readable storage medium having program instructions embodied therewith, wherein the computer readable storage medium is not a transitory signal per se, the program instructions executable by a processor to cause the processor to perform a method for generating a summary text composition, the method comprising:
obtaining historical reading data of a user;
generating, based on the historical reading data, a reading proficiency level of the user;
selecting, based on the reading proficiency level, a summarization model from a set of summarization models, the summarization model comprising a trained machine-learning model;
obtaining a target composition, the target composition selected from the group consisting of a literary work, a video recording, and an audio recording;
obtaining a custom constraint comprising a predetermined specification for the summary text composition;
generating, by the summarization model and based at least in part on the custom constraint, the summary text composition, the summary text composition corresponding to the target composition and having a first reading level classification that matches the reading proficiency level; and
transmitting the summary text composition to a computing device.

16. The computer program product of claim 15, wherein the target composition has a second reading level classification, the second reading level classification being higher than the first reading level classification.

17. The computer program product of claim 15, wherein the target composition includes audio data; the method further comprising:
generating a transcript of the audio data; and
wherein the generating the summary text composition is based at least in part on the transcript of the audio data.

18. The computer program product of claim 15, wherein the historical reading data includes a literary-work purchase history of the user.

19. The computer program product of claim 15, wherein the historical reading data includes the literary work; and
the determining the reading proficiency level comprises comparing the literary work to a set of reading-level classification standards.

20. The computer program product of claim 15, wherein the custom constraint is selected from the group consisting of a word limit and a reading time.

* * * * *